Oct. 29, 1935.  W. B. GAFFNER  2,019,343

SPEED REDUCER

Filed June 16, 1934

INVENTOR.
WALTER BERESFORD GAFFNER

BY Lawler & Lawler

ATTORNEYS.

Patented Oct. 29, 1935

2,019,343

UNITED STATES PATENT OFFICE 2,019,343

SPEED REDUCER

Walter Beresford Gaffner, Cleveland, Ohio, assignor of one-half to Bradley Eugene Clarkson, Cleveland, Ohio Application June 16, 1934, Serial No. 730,943

5 Claims. (Cl. 74—301)

The present invention relates to a speed reducing gear in which the driving shaft is connected by a bevel gear with a driven shaft through toothed bevel gears carried by trunnions, stub or short shaft or otherwise connected to or mounted on the driven shaft by means of the first named ones.

The present invention has for one of its objects a speed reducing means consisting of beveled gears of the class, in which the assembly consists of three properly journaled shafts, and a plurality of bevel gears having a hunting tooth, the teeth being provided with short addendums. The addendum is the height of a tooth above the pitch diameter.

A hunting tooth gear is a gear into which an extra tooth has been introduced in order to make the number of the teeth in the gear and pinion prime to each other, so that any two teeth will not come into contact until each tooth in the small gear has been in contact with every tooth in the large gear. This tends to and does equalize wear on the gears. A hunting tooth may be introduced either into a bevel gear, a spiral or spur gear.

Another object of the invention is to provide a system of gears so arranged on shafts that an unlimited ratio of speeds may be developed.

Another object of the invention is to provide a system of gears wherein one gear may be equipped with a wanting tooth, and such teeth on such gear are made with long addenda.

Another object of the invention is to provide a system of gears wherein all gears in the system except one may be equipped with a wanting tooth, and all of such gears are made with long addendums.

The velocity ratio or value of a train of wheels is found by dividing the speed of the last wheel in the train by the speed of the first wheel. This ratio is usually denoted by the letter "e" and is positive or negative, according as the first and last wheels rotate in the same or opposite directions.

The nature of the invention will be best understood when described in connection with the accompanying drawing, in which—

Similar characters of reference designate corresponding parts throughout the several views.

Figure 1:
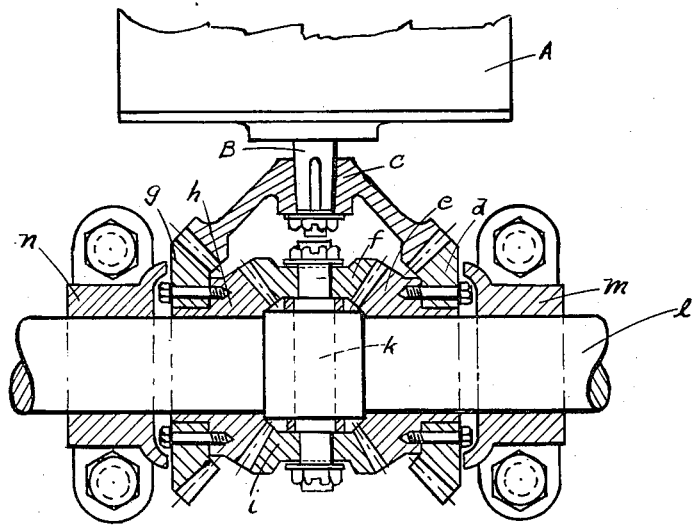
Figure 1 is a cross sectional view of the entire gear assembly with the power source shown fragmentary.

Referring to the drawing—A is source of power having a driving shaft B to which is fixed or otherwise secured to a bevel gear c. l is a driven shaft having loosely mounted thereon an inner bevel gear e, and an inner bevel gear h. Mounted on the inner bevel gear e and fixedly secured thereto is an outer bevel gear d. Mounted on the inner bevel gear h and fixedly secured thereto is an outer bevel gear g.

Intermediate these sets of bevel gears is provided in the driven shaft, trunnions or a stub or short shaft k having loosely mounted thereon beveled gears wheels f and i. The driven shaft l is journalled in suitable ball or roller bearings m and n. The driving bevel gear c meshes with the outer bevel gear d and the outer bevel gear g. The inner bevel gears e and h mesh with the loosely mounted gears f and i on the trunnions or stub or short shaft k.

Figure 2:
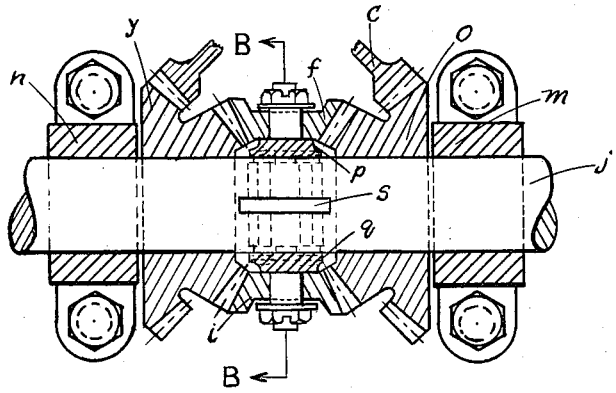
Figure 2 is a fragmentary cross section showing certain gears of the assembly as being of integral structure.
Figure 3:
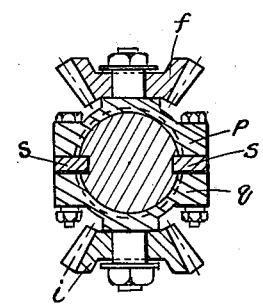
Figure 3 is a modified cross sectional form of the driven shaft with gears attached to a split bearing keyed thereon.

In the modified form as shown in Figures 2 and 3 the inner and outer bevel gears are integral structures as shown at o and y. Also is shown herein another method of mounting the intermediate bevel gears f and i on the driven shaft j. This method shows complementary sections p and q mounted on the shaft j and having therebetween keys s, the sections being properly bolted together.

Figure 4:
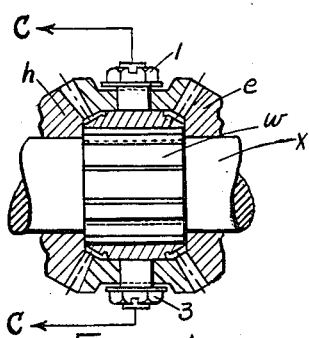
Figure 4 is a fragmentary sectional view of the driven shaft with certain gears in the assembly shown as being splined to the shaft.
Figure 5:
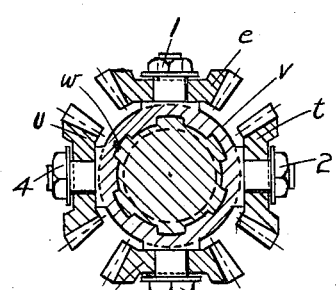
Figure 5 is a sectional end view of Figure 4 showing a plurality of gears splined to the shaft.

In Figures 4 and 5 another modification is shown in which a plurality of gears are shown as being splined as at w on the driven shaft x.

The operation of the machine is as follows. The driver through its source of power rotates the bevel gear on its shaft. The rotation of this gear rotates the combined gear d and e in a clockwise direction while at the same time it rotates the combined gear g and h in a counter-clockwise direction. It will be understood however that such rotation may be reversed by the reversal of the power source. The rotation of the combined gears d and e together with g and h meshing with the intermediate bevel gear wheels f and i mounted on the stub shaft or trunnions k in or on the driven shaft l through their opposing motion of the gears on the shaft l rotates the driven shaft l.

It will be understood that the same result may be accomplished in the mechanism shown in the modified forms.

To obtain a speed ratio between the driver and driven shafts it is necessary that either one or more gears, but not the complete set of gears in the assembly shall be provided with a hunting tooth and when such hunting tooth is used the addendum on the teeth of the hunting gear or gears is short.

It is also possible to obtain a speed ratio between the driver and driven shafts by eliminating a tooth from a gear or gears, but not from all the gears of the set in the assembly, and when such gear or gears is or are made with a wanting tooth, then the addendum of the teeth on the wanting gear or gears is long.

It will also be understood that a combination of long and short addendum teeth may be used on the various gears in the assembly, and when such is done a speed ratio is then obtainable.

By using various combinations of long and short addendum teeth it is possible to obtain a speed ratio computed to meet the exigencies of use.

When all the teeth on the various gears are of the same construction, such as all being equipped with long addendum teeth, or all with short addendum teeth, or all with plain stub teeth, or all with any other type of gear teeth, the gears will rotate loosely on the driven shaft and the stub shaft, but no motion will be transmitted to the driven shaft.

Spur gears instead of bevel wheels can be employed in the mechanism according to this invention and other members can be modified without departing from the spirit of my invention; that is long and short addendum teeth may be employed with the spur gears.

While I have shown and described one embodiment of the invention it will be understood that this has been chosen for the purpose of illustration only and that I do not desire to be limited to the details of construction shown and described, for obvious modifications will occur to a person skilled in the art.

Having thus fully described my invention, what I claim as new and desire to secure by Letters Patent, is,—

1. In combination with a driving shaft and a driven shaft: a differential speed reducing mechanism comprising a single driving bevel wheel adapted to be driven by said driving shaft, said bevel wheel having teeth with regular addenda, that is teeth where the addendum of the teeth is one-half of the working depth of the teeth, a pair of positively connected double bevel gears each having an outer and inner toothed rim, freely mounted on the driven shaft and adapted to rotate in opposite directions thereon, epicyclic bevel gears carried by the driven shaft, said epicyclic gears having teeth with regular addenda, and adapted to be driven by said double bevel gears, one of the said positively connected bevel gears having its outer and inner rims provided with teeth having long addenda, said long addendum toothed rims being rims where the addendum of the teeth has been increased enough so that it takes one less tooth to go around the rim blank than the gear would have if regular addendum teeth were used, whilst the other positively connected double gear is provided on its outer rim with regular addendum teeth, that is teeth where the addendum of the teeth is one-half of the working depth of the teeth, whilst the inner rim of the gear is provided with teeth having short addenda, that is teeth where the addendum of the teeth has been decreased so that it takes one more tooth to go around the rim blank than the gear blank would have were regular addendum teeth used, the epicyclic gears meshing with the inner toothed rims, and the outer rims meshing with the driving bevel wheel of the said differential speed reducing mechanism.

2. In combination with a driving shaft and a driven shaft: a differential speed reducing mechanism comprising a single driving bevel wheel adapted to be driven by said driving shaft, said bevel wheel having teeth with regular addenda, that is teeth where the addendum of the teeth is one-half of the working depth of the teeth, a pair of detachably connected bevel gears each having an outer and inner toothed rim, freely mounted on the driven shaft and adapted to rotate in opposite directions thereon, epicyclic bevel gears carried by the driven shaft, said epicyclic gears having teeth with regular addenda, and adapted to be driven by said double bevel gears, one pair of the said detachably connected bevel gears having its outer and inner rims provided with teeth having regular addenda, that is teeth where the addendum of the teeth is one-half of the working depth of the teeth, whilst the outer rim of the opposite bevel gear is provided with teeth having long addenda, said long addendum toothed rim being a rim where the addendum of the tooth has been increased enough so that it takes one less tooth to go around the rim blank than the gear would have if regular addendum teeth were used, whilst the inner rim of the said bevel gear is provided with teeth having short addenda, that is teeth where the addendum of the teeth has been decreased so that it takes one more tooth to go around the rim blank than the gear blank would have were regular addendum teeth used, the epicyclic gears meshing with the inner toothed rims, and the outer rims meshing with the driving bevel wheel of the said differential speed reducing mechanism.

3. In combination with a driving shaft and a driven shaft: a differential speed reducing mechanism comprising a single driving bevel wheel adapted to be driven by said driving shaft, said bevel wheel having teeth with regular addenda, that is teeth where the addendum of the teeth is one-half of the working depth of the teeth, a pair of independent gears connected together of bevel configuration, each having an outer and inner toothed rim, freely mounted on the driven shaft and adapted to rotate in opposite directions thereon, epicyclic bevel gears carried by the driven shaft, said epicyclic gears having teeth with regular addenda, and adapted to be driven by said double bevel gears connected together, one of the said connected bevel gears having its outer and inner toothed rims provided with teeth having long addenda, said long addendum toothed rims being rims where the addendum of the teeth has been increased enough so that it takes one less tooth to go around the rim blank than the gear would have if regular addendum teeth were used, whilst the outer rim of the other connected bevel gear is provided with teeth having short addenda, that is teeth where the addendum of the teeth has been decreased so that it takes one more tooth to go around the rim blank than the gear blank would have were regular addendum teeth used, the inner rim of the said bevel gear being provided with teeth having regular addenda, that is teeth where the addendum of the teeth is one-half of the working depths of the teeth, the epicyclic gears meshing with the inner toothed rims, and the outer rims meshing with the driving bevel wheel of the said differential speed reducing mechanism.

4. In combination with a driving shaft and a driven shaft: a differential speed reducing mechanism comprising a single driving bevel wheel adapted to be driven by said driving shaft, said bevel wheel having teeth with regular addenda, that is teeth where the addendum of the teeth is one-half of the working depth of the teeth, a pair of connected double bevel gears each having an outer and inner toothed rim, freely mounted on the driven shaft and adapted to rotate in opposite directions thereon, epicyclic bevel gears carried by the driven shaft, said epicyclic gears having teeth with regular addenda, and adapted to be driven by said double bevel gears, one of the said connected bevel gears having its outer and inner rims provided with teeth having long addenda, said long addendum toothed rims being rims where the addendum of the teeth has been increased enough so that it takes one less tooth to go around the rim blank than the gear would have if regular addendum teeth were used, whilst the other connected double gear is provided on its outer rim with teeth having long addenda, said long addendum toothed rim being a rim where the addendum of the teeth has been increased enough so that it takes one less tooth to go around the rim blank than the gear would have if regular addendum teeth were used, the inner rim of the said gear being provided with teeth having regular addenda, that is teeth where the addenda of the teeth are one-half of the working depth of the teeth, the epicyclic gears meshing with the inner toothed rims, and the outer rims meshing with the driving bevel wheel of the said differential speed reducing mechanism.

5. In combination with a driving shaft and a driven shaft: a differential speed reducing mechanism comprising a single bevelled driving pinion adapted to be driven by said driving shaft, said bevelled pinion having teeth with regular addenda, that is teeth where the addendum of the tooth is one-half of the working depth of the teeth, a pair of double companion bevel gears, each gear provided with an inner and outer toothed rim and adapted to be rotated in different directions, planetary pinions rotatably supported by said driven shaft and meshing with the inner rim of each companion gear, the companion gears adapted to rotate at different speeds according to the location, diameter and relative position of the rims provided with long and short and regular addenda meshing with the driving pinion and the planetary pinions.

WALTER BERESFORD GAFFNER.